UNITED STATES PATENT OFFICE.

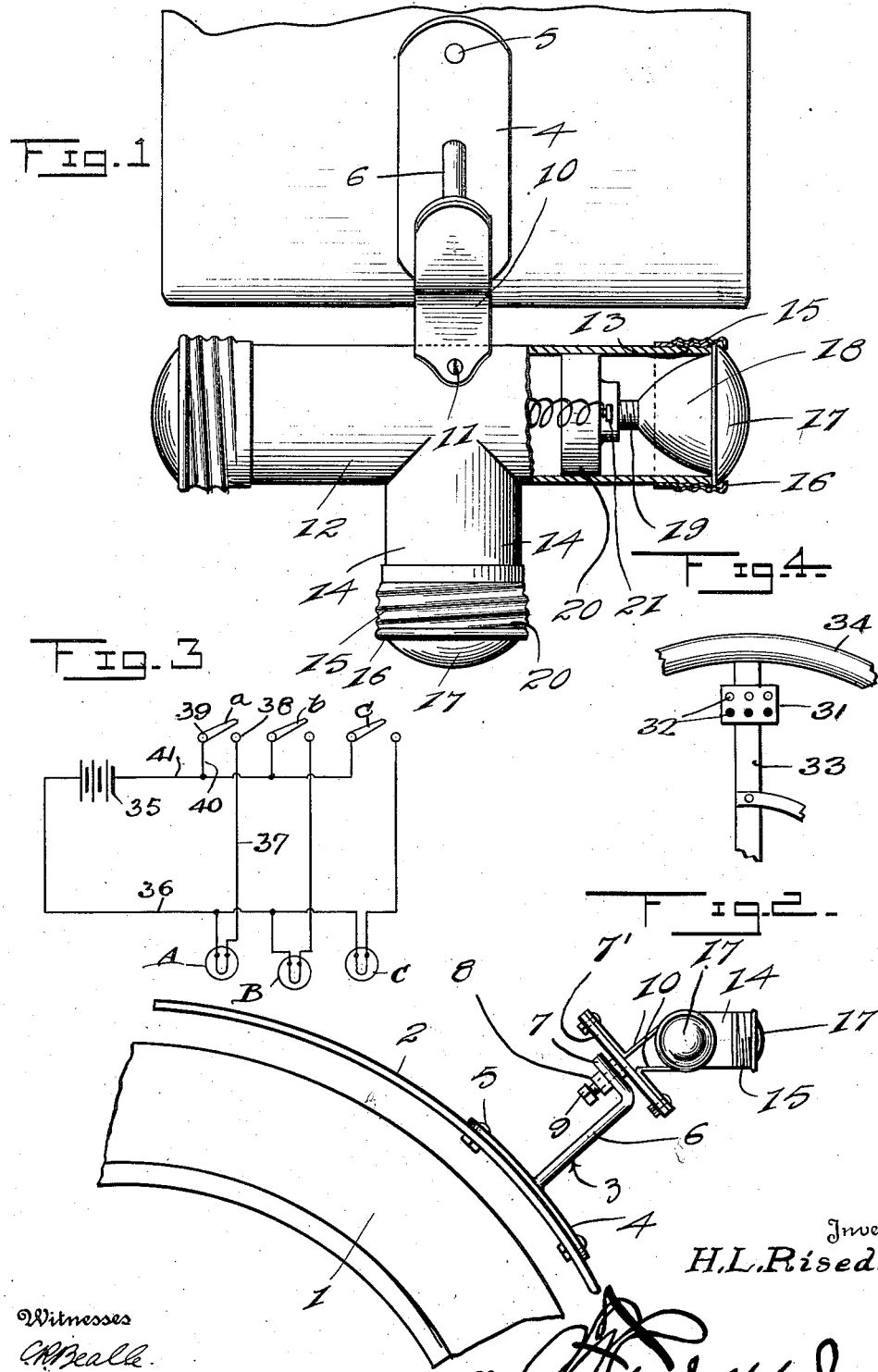

HARRY L. RISEDORF, OF BROOKLYN, NEW YORK.

DIRECTION-INDICATOR FOR MOTOR-VEHICLES.

1,295,603.  Specification of Letters Patent.  Patented Feb. 25, 1919.

Application filed October 30, 1915. Serial No. 58,869.

*To all whom it may concern:*

Be it known that I, HARRY L. RISEDORF, a citizen of the United States, residing at Brooklyn, in the county of Kings and State of New York, have invented certain new and useful Improvements in Direction-Indicators for Motor-Vehicles; and I do hereby declare the following to be a full, clear, and exact description of the invention, such as will enable others skilled in the art to which it appertains to make and use the same.

This invention relates to new and useful improvements in direction indicators for motor vehicles.

One object of the invention is to provide a novel bracket for mounting the device on the vehicle.

Other objects of the invention will appear as the nature of the invention is better understood, reference being had to the accompanying drawings, in which:—

Figure 1 is a view partly in section of a signaling device constructed in accordance with this invention.

Fig. 2 is a fragmentary side elevation of the rear wheel and the rear fender of the motor vehicle illustrating the device applied thereto.

Fig. 3 is the wiring diagram, and

Fig. 4 is a view illustrating the mounting of the control switches.

Referring to the drawings, the numeral 1 designates the usual rear wheel of a motor vehicle which is surrounded by the ordinary fender 2. The bracket used for mounting the indicator is designated generally by the numeral 3 and comprises a base plate 4 riveted or otherwise secured as at 5 to the fender 2 and extending upwardly at a point centrally of the plate 4 is a standard 6, the upper end of which is bent angularly as at 7.

Coöperating with the bracket 3 is a base plate 7', carrying a U-shaped clip 8 in which the set screw 9 is threaded and this clip 8 is adapted to be attached to the standard 6 or to the extension 7 to enable the device to be used at various points on the vehicle. The base plate 7' carries a pair of arms 10 which are secured to the casing of the indicator by a suitable screw or rivet 11.

The indicator consists of tubular casing 12 provided at opposite ends with a screw threaded sleeve 13 and formed centrally of the casing 12 and extending rearwardly therefrom is a tubular casing 14, which coöperates with the casing 12 in providing a substantially T-shaped casing which is hollow and on the ends of the arms of this T-shaped casing the threaded rings 15 are adapted to be threaded. These threaded rings are provided with inturned flanges 16 which are adapted to hold the lenses 17 in place. A suitable reflector 18 is provided for each of the lenses 17 and these reflectors are provided with the screw threaded sleeves 19 in which the lamp bulb is threaded. A suitable insulating block 20 carrying a binding screw 21 is secured in each of the arms and in the stem of the U-shaped casing and this block is carried a suitable central contact of a lamp socket which receives its respective lamp bulb.

The switch box for controlling the lighting of the lights within the T-shaped casing is designated by the numeral 31 and carries a plurality of buttons 32 which are adapted to control the operation of the switches controlling the lights. This switch box 31 is mounted on one of the spokes 33 of the steering wheels 34 of the vehicle and is within easy reach of the operator.

Referring to the wiring diagram, it will be noted that the power is furnished from a suitable battery or a similar power source 35 and the current flows through the wire 36 to the light designated by the character A and thence the current will pass into the wire 37 to the pole 38 of the switch designated a. The opposite poles 39 of the switch a is connected by a wire 40 to the return wire 41 and it will thus be seen that when the switch a is closed, the light A will be lighted. The light B like the light A is connected to the switch b and the light C connected to the switch c. It will thus be seen that as the switches are closed the lights may be lighted and on closing the switch a, the light indicating that the driver will turn to the left will be lighted, while upon closing the switch c, the light indicating that the driver will turn to the right will be lighted while on closing the switch b the light indicating that the operator is going to stop or slow down will be eliminated. In this way it will be seen that a safety device is provided which will eliminate many of the accidents due to the sudden stopping of a vehicle and the colliding of a vehicle following therewith.

While in the foregoing there has been shown and described the preferred embodiment of this invention, it is to be understood that such changes may be made in the combination and arrangement of parts as will fall within the spirit and scope of the appended claim.

What is claimed is:—

A direction signal comprising an attaching plate secured to an automobile, a standard formed on said plate and having a right angularly bent outer end, a clip adapted to be adjustably secured to either the standard or said right angularly bent outer end thereof, a second plate carried by said clip, a pair of arms secured to the second plate, a T-shaped signaling casing carried by said arm, lenses carried by the casing and projecting beyond the ends thereof so as to be visible, and means illuminating said casing.

In testimony whereof I affix my signature in presence of two witnesses.

HARRY L. RISEDORF.

Witnesses:
EDWARD J. KIRK,
WILLIAM PATTERSON.